US012707526B2

(12) United States Patent
Kim

(10) Patent No.: US 12,707,526 B2
(45) Date of Patent: Aug. 11, 2026

(54) METHOD AND APPARATUS FOR PERFORMING CONDITIONAL RECONFIGURATION IN MOBILE WIRELESS COMMUNICATION SYSTEM

(71) Applicants: BLACKPIN INC., Seoul (KR); Soenghun Kim, Gyeonggi-do (KR)

(72) Inventor: Soenghun Kim, Gyeonggi-do (KR)

(73) Assignees: BLACKPIN INC., Seoul (KR); Soenghun Kim, Gyeonggi-do (KR)

( * ) Notice: Subject to any disclaimer, the term of this patent is extended or adjusted under 35 U.S.C. 154(b) by 288 days.

(21) Appl. No.: 18/650,364

(22) Filed: Apr. 30, 2024

(65) Prior Publication Data

US 2024/0389182 A1 Nov. 21, 2024

(30) Foreign Application Priority Data

May 19, 2023 (KR) ........................ 10-2023-0064794

(51) Int. Cl.

*H04W 36/18* (2009.01)
*H04B 7/06* (2006.01)
*H04L 5/00* (2006.01)
*H04W 24/10* (2009.01)
*H04W 76/20* (2018.01)

(52) U.S. Cl.

CPC .......... *H04W 76/20* (2018.02); *H04L 5/0051* (2013.01); *H04W 24/10* (2013.01)

(58) Field of Classification Search

None

See application file for complete search history.

(56) References Cited

U.S. PATENT DOCUMENTS

2017/0164419 A1* 6/2017 Kim ...................... H04W 76/28
2018/0019859 A1* 1/2018 Cheng .................. H04B 7/0626
2019/0053120 A1* 2/2019 Park .................... H04W 36/305
2023/0027718 A1* 1/2023 Venugopal ............ H04L 5/0051
2023/0110446 A1* 4/2023 Ohlsson ............. H04W 36/362 455/442
2023/0247514 A1* 8/2023 Li ....................... H04W 84/047
2024/0172305 A1* 5/2024 Patil ...................... H04W 76/15
2024/0413858 A1* 12/2024 Mcmenamy .......... H04W 24/10

(Continued)

OTHER PUBLICATIONS

3GPP, 3Rd Generation Partnership Project; Technical Specification Group Radio Access Network; NR; Multiplexing and channel coding (Release 17), Mar. 2023, pp. 1-203, 3GPP TS 38.212 V17.5.0, http://www.3gpp.org.

(Continued)

*Primary Examiner* — Sithu Ko
(74) *Attorney, Agent, or Firm* — Nicholas Park

(57) ABSTRACT

A method and apparatus to support conditional reconfiguration is provided. Method for supporting conditional reconfiguration includes receiving from a base station a RRC reconfiguration message, receive from the base station physical layer control information related to conditional reconfiguration and applying a RRC reconfiguration message associated with a specific applicable cell based on whether the specific applicable cell is configured with a first parameter, whether the physical layer control information related to conditional reconfiguration is received, reference signal received power of the specific applicable cell and a specific bit of the physical layer control information.

15 Claims, 6 Drawing Sheets

(56) References Cited

U.S. PATENT DOCUMENTS

| | | | | |
|---|---|---|---|---|
| 2025/0234422 | A1* | 7/2025 | Chandrashekar ..... | H04W 76/28 |
| 2025/0365594 | A1* | 11/2025 | Da Silva ............... | H04W 24/10 |

OTHER PUBLICATIONS

3GPP, 3Rd Generation Partnership Project; Technical Specification Group Radio Access Network; NR; Physical layer procedures for control (Release 17), Mar. 2023, pp. 1-262, 3GPP TS 38.213 V17.5.0, http://www.3gpp.org.

3GPP, 3Rd Generation Partnership Project; Technical Specification Group Radio Access Network; NR; Radio Resource Control (RRC) protocol specification (Release 17), Mar. 2023, pp. 1-1324, 3GPP TS 38.331 V17.4.0, http://www.3gpp.org.

3GPP, 3Rd Generation Partnership Project; Technical Specification Group Radio Access Network; NR; Medium Access Control (MAC) protocol specification (Release 17), Mar. 2023, pp. 1-203, 3GPP TS 38.321 V17.4.0, http://www.3gpp.org.

* cited by examiner

METHOD AND APPARATUS FOR PERFORMING CONDITIONAL RECONFIGURATION IN MOBILE WIRELESS COMMUNICATION SYSTEM

CROSS-REFERENCE TO RELATED APPLICATION

This application claims priority to and the benefit of Korean Patent Application No. 10-2023-0064794, filed on May 19, 2023, the disclosure of which is incorporated herein by reference in its entirety.

BACKGROUND

Technical Field

The present disclosure relates to conditional reconfiguration in a mobile communication system. More specifically, the present disclosure relates to evaluation for conditional reconfiguration and execution of conditional reconfiguration.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

In the 5G communication system, various services like network energy saving and non-terrestrial network are introduced. These new services impose difficulties in mobility in that network node covering a certain geographical area may change during a short period of time. To tackle the problems, enhancements on conditional reconfiguration could be considered.

SUMMARY

Aspects of the present disclosure are to address the problems of conditional reconfiguration. The method includes receiving from a base station a RRC reconfiguration message, receive from the base station physical layer control information related to conditional reconfiguration and applying a RRC reconfiguration message associated with a specific applicable cell based on whether the specific applicable cell is configured with a first parameter, whether the physical layer control information related to conditional reconfiguration is received, reference signal received power of the specific applicable cell and a specific bit of the physical layer control information.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Figure 1A:
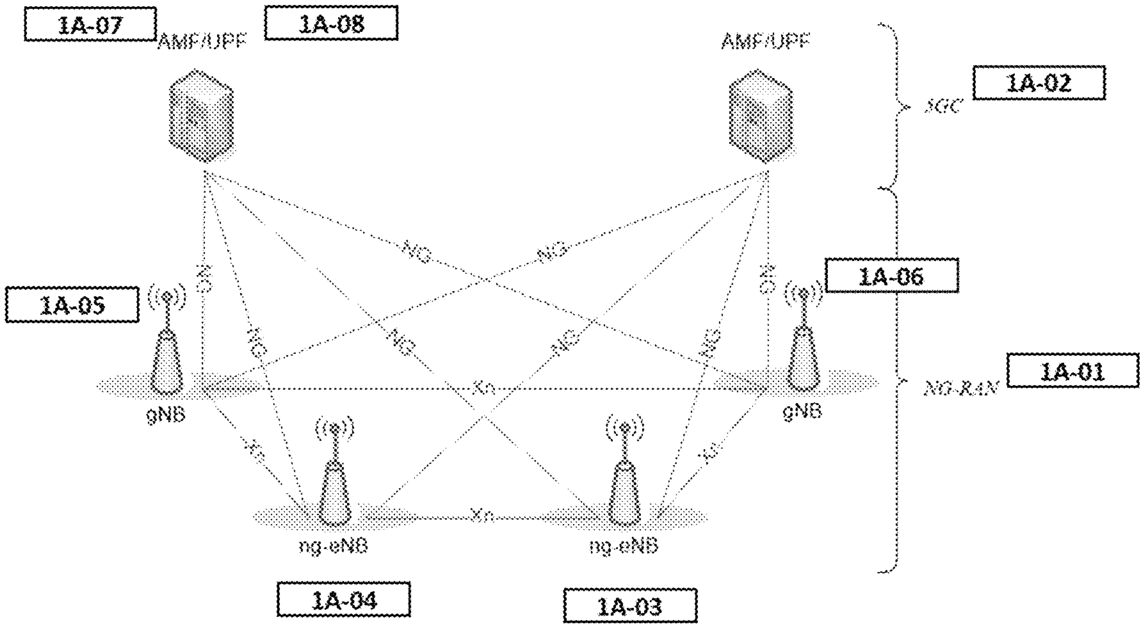
FIG. 1A is a diagram illustrating the architecture of an 5G system and a NG-RAN to which the disclosure may be applied.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
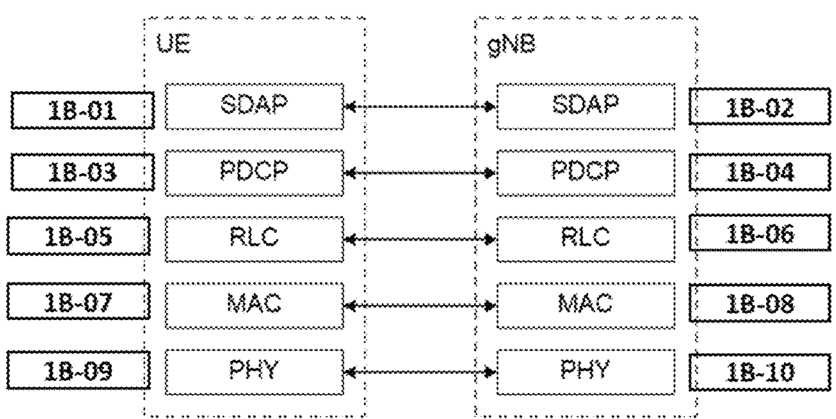
FIG. 1B is a diagram illustrating a wireless protocol architecture in an 5G system to which the disclosure may be applied.
Figure 1B:
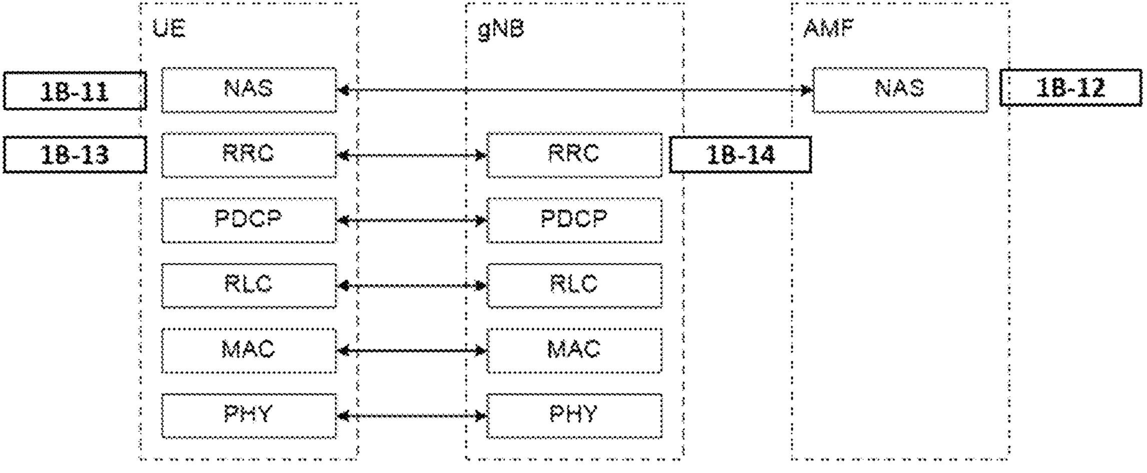

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed below.

NAS: authentication, mobility management, security control etc

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

An IE in a field may contain one or more chield fields and child IEs. In that sense, an IE can be regarded as a container.

A container contains one or more child fields and child containers. Presence of a (child/downstream) fields under a (parent/upstream) container is determined by the presence of the (parent/upstream) container. A (child/downstream) field associated with a (parent/upstream) container (i.e. a field under a container) is absent if the associated (parent/upstream) container is absent. A (child/downstream) field associated with a container may be present if the associated (parent/upstream) container is present. Presence of a container affects presence of fields under the container.

Presence of a field under a container A is not affected by presence of container B unless the container B is contained in the container A or vice versa.

Container A and container B do not affect each other in terms of presence unless the container B is contained in the container A or vice versa. Presence of a container does not affect the presence of the other container in the same level.

Figure 1C:
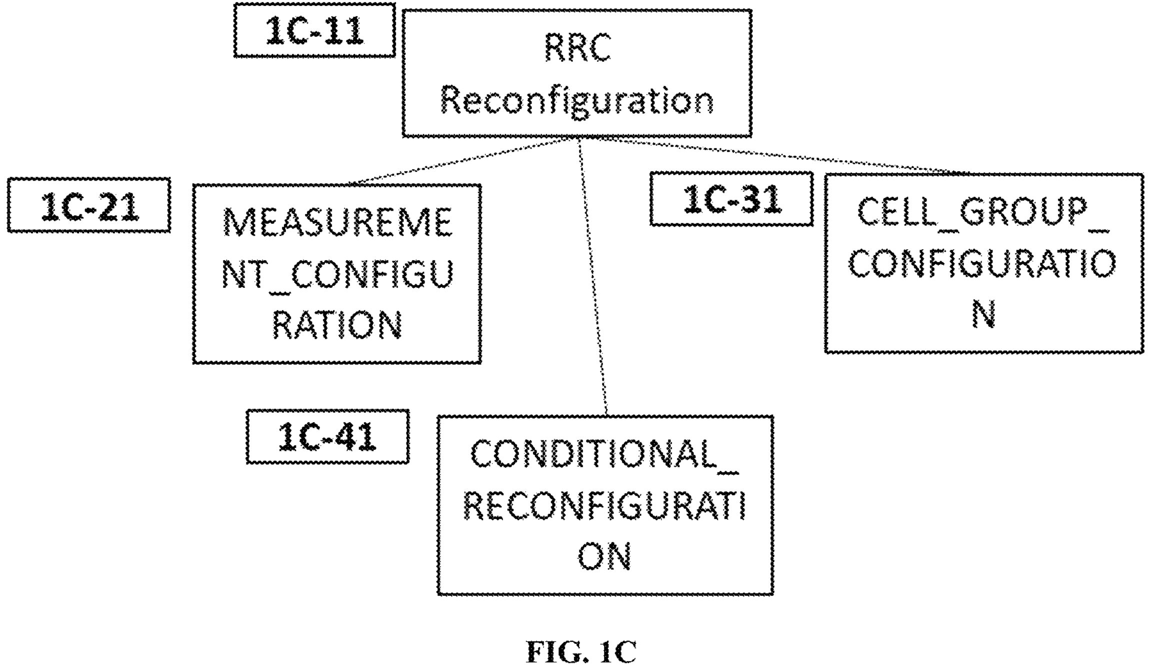
FIG. 1C is a diagram illustrating structure of a RRC reconfiguration message.

FIG. 1C illustrates a RRC Reconfiguration message.

A RRC Reconfiguration Message 1C-11 comprises various fields and IEs for a UE.

A RRC Reconfiguration Message may comprise a measurement_confiugration and a master_cell_group and a conditional_reconfiguration.

The measurement_confiugration includes a MEASUREMENT_CONFIUGRATION 1C-21.

The master_cell_group includes CELL_GROUP_CONFIGURATION 1C-31.

The conditional_reconfiguration includes CONDITIONAL_RECONFIGURATION 1C-41.

The MEASUREMENT_CONFIGURATION specifies measurements to be performed by the UE, and covers intra-frequency, inter-frequency and inter-RAT mobility as well as configuration of measurement gaps.

The MEASUREMENT_CONFIGURATION comprises following fields and IEs.

```
MEASUREMENT_CONFIGURATION ::= SEQUENCE {
  measurement_object_box_list
MEASUREMENT_OBJECT_BOX_LIST OPTIONAL,
  report_configuration_box_list
REPORT_CONFIGURATION_BOX_LIST OPTIONAL,
  measurement_identifier_box_list
MEASUREMENT_IDENTIFIER_BOX_LIST OPTIONAL,
  skip_measurement_configuration CHOICE {
  ssb_rsrp RSRP-Range,
  csi_rsrp RSRP-Range
  } OPTIONAL,
  measurement_quantity_configuration_container
MEASUREMENT_QUANTITY_CONFIGURATION_CONTAINER
OPTIONAL,
  ...
  }
  measurement_identifier_box_list: List of
  MEASUREMENT_IDENTIFIER_BOXs.
  measurement_object_box_list: List of
  MEASUREMENT_OBJECT_BOXs.
  report_configuration_box_list: List of
  REPORT_CONFIGURATION_BOXs.
```

skip_measurement_configuration: Threshold for NR SpCell RSRP measurement controlling when the UE is required to perform measurements on non-serving cells. Choice of ssb_rsrp corresponds to cell RSRP based on SS/PBCH block and choice of csi_rsrp corresponds to cell RSRP of CSI-RS.

The MEASUREMENT_IDENTIFIER_BOX_LIST concerns a list of measurement-identifiers to add or modify, with for each entry the MEASUREMENT_IDENTIFIER, the associated MEASUREMENT_OBJECT_IDENTIFIER and the associated REPORT_CONFIGURATION_IDENTIFIER.

```
MEASUREMENT_IDENTIFIER_BOX_LIST ::= SEQUENCE
(SIZE (1.. integer)) OF MEASUREMENT_IDENTIFIER_BOX
MEASUREMENT_IDENTIFIER_BOX ::= SEQUENCE {
measurement_identifier MEASUREMENT_IDENTIFIER,
measurement_object_identifier
MEASUREMENT_OBJECT_IDENTIFIER,
report_configuration_identifier
REPORT_CONFIGURATION_IDENTIFIER
}
```

A MEASUREMENT_identifier associated with a first type report-configuration is a first type measurement-identifier.

A MEASUREMENT_identifier associated with a second type report-configuration is a second type measurement-identifier.

A first type report-configuration is configured by the REPORT_CONFIGURATION that contains a type1_event_triggered.

A second type report-configuration is configured by the REPORT_CONFIGURATION that contains a type2_event_triggered.

The MEASUREMENT_OBJECT_BOX_LIST concerns a list of measurement-objects to add or modify.

```
MEASUREMENT_OBJECT_BOX_LIST ::= SEQUENCE (SIZE
(1.. integer)) OF MEASUREMENT_OBJECT_BOX
MEASUREMENT_OBJECT_BOX ::= SEQUENCE {
measurement_object_identifier
MEASUREMENT_OBJECT_IDENTIFIER,
measurement_object_nr MEASUREMENT_OBJECT_NR,
}
```

The MEASUREMENT_OBJECT_NR specifies information applicable for SS/PBCH block(s) intra/inter-frequency measurements and/or CSI-RS intra/inter-frequency measurements.

```
MEASUREMENT_OBJECT_NR ::= SEQUENCE {
ssb_frequency ARFCN-ValueNR OPTIONAL,
reference_signal_configuration
REFERENCE_SIGNAL_CONFIGURATION,
absolute_threshold_ssb_consolidation THRESHOLD_NR OPTIONAL,
number_of_ssb_to_average INTEGER (2..integer) OPTIONAL,
measurement_quantity_configuration_index INTEGER (1.. integer),
measurement_quantity_configuration_index_2 INTEGER (1.. integer),
}
```

absolute_threshold_ssb_consolidation: Absolute threshold for the consolidation of measurement results per SS/PBCH block(s) from L1 filter(s). The field is used for the derivation of cell measurement results and the reporting of beam measurement information per SS/PBCH block index.

number_of_ssb_to_average: Indicates the maximum number of measurement results per beam based on SS/PBCH blocks to be averaged. The same value applies for each detected cell associated with this measurement-object.

measurement_quantity_configuration_index: Indicates the n-th element of measurement_qauntity_configuration_nr_list provided in MEASUREMENT_CONFIGURATION for type1 measurement on first applicable cells.

measurement_quantity_configuration_index_2: Indicates the n-th element of measurement_qauntity_configuration_nr_list provided in MEASUREMENT_CONFIGURATION for type2 measurment on a second appicable cell.

ssb_frequency: Indicates the frequency of the SS associated to this MEASUREMENT_OBJECT_NR.

The REPORT_CONFIGURATION_BOX_LIST concerns a list of reporting configurations to add or modify.

```
REPORT_CONFIGURATION_BOX_LIST ::= SEQUENCE (SIZE
(1.. integer)) OF REPORT_CONFIGURATION_BOX
REPORT_CONFIGURATION_BOX ::= SEQUENCE {
report_configuration_identifier
REPORT_CONFIGURATION_IDENTIFIER,
report_configuration REPORT_CONFIGURATION,
}
```

The REPORT_CONFIGURATION specifies criteria for triggering of an NR measurement reporting event or of a CHO, CPA or CPC event For events labelled AN with N equal to 1, 2 and so on, measurement reporting events and CHO, CPA or CPC events are based on cell measurement results, which can either be derived based on SS/PBCH block or CSI-RS.

```
REPORT_CONFIGURATION ::= SEQUENCE {
report_type CHOICE {
type1_event_triggered TYPE1_EVENT_CONFIGURATION,
type2_event_triggered TYPE2_EVENT_CONFIGURATION,
  }
}
TYPE2_EVENT_CONFIGURATION ::= SEQUENCE {
type2_event_type CHOICE {
type2_event_a3 SEQUENCE {
a3_offset MEASUREMENT_TRIGGER_QUANTITY_OFFSET,
hysteresis Hysteresis,
duration_to_trigger DURATION_TO_TRIGGER
  },
type2_event_a4 SEQUENCE {
a4_threshold MEASUREMENT_TRIGGER_QUANTITY,
hysteresis Hysteresis,
duration_to_trigger DURATION_TO_TRIGGER
  },
type2_event_t1 SEQUENCE {
t1_threshold INTEGER (0..549755813887),
evaluation_duration INTEGER (1..6000)
  }
},
reference_signal_type NR_REFERENCE_SIGNAL_TYPE,
...
}
TYPE1_EVENT_CONFIGURATION::= SEQUENCE {
type1_event_type CHOICE {
type1_event_a1 SEQUENCE {
a1-Threshold MEASUREMENT_TRIGGER_QUANTITY,
hysteresis Hysteresis,
duration_to_trigger DURATION_TO_TRIGGER
  },
type1_event_a2 SEQUENCE {
a2-Threshold MEASUREMENT_TRIGGER_QUANTITY,
hysteresis Hysteresis,
duration_to_trigger DURATION_TO_TRIGGER
  },
type1_event_a3 SEQUENCE {
a3_offset MEASUREMENT_TRIGGER_QUANTITY_OFFSET,
hysteresis Hysteresis,
duration_to_trigger DURATION_TO_TRIGGER,
  },
type1_event_a4 SEQUENCE {
a4_threshold MEASUREMENT_TRIGGER_QUANTITY,
hysteresis Hysteresis,
duration_to_trigger DURATION_TO_TRIGGER,
  },
},
reference_signal_type NR_REFERENCE_SIGNAL_TYPE,
}
NR_REFERENCE_SIGNAL_TYPE ::= ENUMERATED {ssb, csi-rs}
MEASUREMENT_TRIGGER_QUANTITY ::= CHOICE {
rsrp RSRP-Range,
rsrq RSRQ-Range,
sinr SINR-Range
}
```

-continued

```
MEASUREMENT_TRIGGER_QUANTITY_OFFSET ::= CHOICE {
rsrp INTEGER (-30..30),
rsrq INTEGER (-30..30),
sinr INTEGER (-30..30)
}
```

REPORT_CONFIGURATION Field Descriptions report_type: Type of the configured measurement report. The type2_event_triggered is used for CHO, CPA or CPC configuration.

TYPE2_EVENT_CONFIGURATION Field Descriptions a3_offset: Offset value(s) to be used in NR conditional reconfiguration triggering condition for type2-event-a3. The actual value is field value*0.5 dB.

a4_threshold: Threshold value associated to the selected trigger quantity (e.g. RSRP, RSRQ, SINR) per RS Type (e.g. SS/PBCH block, CSI-RS) to be used in NR conditional reconfiguration triggering condition for type2-event-a4.

a5-Threshold1/a5-Threshold2: Threshold value associated to the selected trigger quantity (e.g. RSRP, RSRQ, SINR) per RS Type (e.g. SS/PBCH block, CSI-RS) to be used in NR conditional reconfiguration triggering condition for cond event a5. In the same condtype1_event_a5, the network configures the same quantity for the MEASUREMENT_TRIGGER_QUANTITY of the a5-Threshold1 and for the MEASUREMENT_TRIGGER_QUANTITY of the a5-Threshold2.

type2_event_type: Choice of NR conditional reconfiguration event triggered criteria.

Evaluation_duration: This field is used for defining the leaving condition for type2_event_t1. Each step represents 100 ms.

t1_threshold: The field counts the number of UTC seconds in 10 ms units since 00:00:00 on Gregorian calendar date 1 Jan. 1900 (midnight between Sunday, Dec. 31, 1899 and Monday, Jan. 1, 1900).

DURATION_TO_TRIGGER: Time during which specific criteria for the event needs to be met in order to execute the conditional reconfiguration execution.

TYPE1_EVENT_CONFIGURATION Field Descriptions a3_offset: Offset value(s) to be used in NR measurement report triggering condition for type1_event_a3/a6. The actual value is field value*0.5 dB.

aN-ThresholdM: Threshold value associated to the selected trigger quantity (e.g. RSRP, RSRQ, SINR) per RS Type (e.g. SS/PBCH block, CSI-RS) to be used in NR measurement report triggering condition for event number aN.

type1_event_type: Choice of NR event triggered reporting criteria.

The MEASUREMENT_QUANTITY_CONFIGURATION_CONTAINER specifies the measurement quantities and layer 3 filtering coefficients for NR and inter-RAT measurements.

```
MEASUREMENT_QUANTITY_CONFIGURATION_CONTAINER
::= SEQUENCE {
  measurement_qauntity_configuration_nr_list SEQUENCE (SIZE (1..
integer)) OF MEASUREMENT_QAUNTITY_CONFIGURATION_NR
OPTIONAL,
  }
```

A MEASUREMENT_QAUNTITY_CONFIGURATION_NR comprises at least one FILTER_COEFFICIENT. A FILTER_COEFFICIENT specifies the measurement filtering coefficient. Value fc0 corresponds to k=0, fc1 corresponds to k=1, and so on.

The CELL_GROUP_CONFIGURATION is used to configure a master cell group (MCG) or secondary cell group (SCG). A cell group comprises of one MAC entity, a set of logical channels with associated RLC entities and of a primary cell (SpCell) and one or more secondary cells (SCells).

```
  CELL_GROUP_CONFIGURATION::= SEQUENCE {
  physical_cell_group_configuration
PHYSICAL_CELL_GROUP_CONFIGURATION OPTIONAL,
  special_cell_configuration SPECIAL_CELL_CONFIGURATION
  OPTIONAL,
  scell_box_list SEQUENCE (SIZE (1.. integer)) OF SCELL_BOX
  OPTIONAL,
  }
```

SPECIAL_CELL_CONFIGURATION includes a TERMINAL_SPECIFIC_CELL_CONFIGURATION of the target cell and a TARGET_CELL_CONFIGURATION.

TARGET_CELL_CONFIGURATION includes a CELL_SPECIFIC_CELL_CONFIGURATION and local_scheduling_identifier. local_scheduling_identifier indicates a local-terminal-identifer to be used for PDSCH scheduling and PUSCH scheduling in the target cell.

SCELL_BOX includes a TERMINAL_SPECIFIC_CELL_CONFIGURATION of the SCell and CELL_SPECIFIC_CELL_CONFIGURATION of the SCell and the index for the SCell (to identify the SCell).

PHYSICAL_CELL_GROUP_CONFIGURATION comprises cell group specific L1 parameters. PHYSICAL_CELL_GROUP_CONFIGURATION comprises a local_non_scheduling_identifier_layer1 and a a local_non_scheduling_identifier_layer3.

TERMINAL_SPECIFIC_CELL_CONFIGURATION configures the UE with a serving cell.

```
  TERMINAL_SPECIFIC_CELL_CONFIGURATION ::=
  SEQUENCE {
  initial_downlink_partial_cell_configuration
DEDICATED_DOWNLINK_PARTIAL_CELL_CONFIGURATION
OPTIONAL,
  downlink_partial_cell_box_list SEQUENCE (SIZE (1..integer)) OF
DOWNLINK_PARTIAL_CELL_BOX OPTIONAL,
  first_downlink_partial_cell_identifier
  PARTIAL_CELL_IDENTIFIER OPTIONAL,
  uplink_configuration UPLINK_CONFIGURATION OPTIONAL,
  supplementary_uplink_configuration UPLINK_CONFIGURATION
  OPTIONAL,
  ...
  }
```

first_downlink_partial_cell_identifier: This field contains the ID of the downlink partial-cell to be activated.

downlink_partial_cell_box_list: List of additional downlink partial-cells to be added or modified initial_downlink_partial_cell_configuration: The dedicated (UE-specific) configuration for the initial downlink partial-cell.

supplementary_uplink_configuration: This field contains uplink configuration of supplementary uplink.

uplink_configuration: This field contains uplink configuration of normal uplink.

UPLINK_CONFIGURATION IE comprises following fields and IEs.

```
UPLINK_CONFIGURATION ::= SEQUENCE {
  initial_uplink_partial_cell_configration
DEDICATED_UPLINK_PARTIAL_CELL_CONFIGURATION
OPTIONAL,
  uplink_partial_cell_box_list SEQUENCE (SIZE (1..integer)) OF
UPLINK_PARTIAL_CELL_BOX OPTIONAL,
  first_uplink_partial_cell_identifier PARTIAL_CELL_IDENTIFIER
  OPTIONAL,
  ...
  }
```

first_uplink_partial_cell_identifier: This field contains the ID of the uplink partial-cell to be activated.

initial_uplink_partial_cell_configration: The dedicated (UE-specific) configuration for the initial uplink partial-cell.

uplink_partial_cell_box_list: The additional partial-cells for uplink to be added or modified.

The IE CELL_SPECIFIC_CELL_CONFIGURATION is used to configure cell specific parameters of a UE's serving cell.

```
CELL_SPECIFIC_CELL_CONFIGURATION ::= SEQUENCE {
  local_cell_identifier LOCAL_CELL_IDENTIFIER OPTIONAL,
  common_downlink_confguration
COMMON_DOWNLINK_CONFGURATION OPTIONAL,
  common_uplink_configuration
COMMON_UPLINK_CONFGURATION OPTIONAL OPTIONAL,
  common_supplementary_uplink_configuration
COMMON_UPLINK_CONFGURATION OPTIONAL OPTIONAL,
  ...
  }
```

local_cell_identifier: indicates the cell identifier of the serving cell that is locally unique. Local_cell_identifier is used in the physical layer processing such as scrambling. Integer between 0 and 1008.

common_downlink_confguration: contains the common downlink configuration of the serving cell, including the frequency information configuration and the initial downlink partial-cell common configuration.

common_uplink_configuration: contains the common uplink configuration of the normal uplink.

common_supplementary_uplink_configuration: contains the common uplink configuration of the supplementary uplink.

COMMON_DOWNLINK_CONFGURATION provides common downlink parameters of a cell. This IE comprises a DOWNLINK_FREQUENCY_CONFIGURATION IE and a COMMON_DOWNLINK_PARTIAL_CELL_CONFIGURATION IE.

DOWNLINK_FREQUENCY_CONFIGURATION comprises basic parameters of a downlink carrier.

COMMON_DOWNLINK_PARTIAL_CELL_CONFIGURATION provides downlink partial-cell configuration for an initial downlink partial-cell.

COMMON_UPLINK_CONFGURATION OPTIONAL provides common uplink parameters of a cell. The IE comprise a UPLINK_FREQUENCY_CONFIGURATION IE and a COMMON_UPLINK_PARTIAL_CELL_CONFIGURATION IE.

UPLINK_FREQUENCY_CONFIGURATION provides absolute uplink frequency configuration and subcarrier specific virtual carriers.

COMMON_UPLINK_PARTIAL_CELL_CONFIGURATION provides uplink partial-cell configuration for an initial uplink partial-cell.

DOWNLINK_PARTIAL_CELL_BOX is used to configure an additional downlink partial-cell (not for the initial partial-cell). DOWNLINK_PARTIAL_CELL_BOX comprises a PARTIAL_CELL_IDENTIFIER and a COMMON_DOWNLINK_PARTIAL_CELL_CONFIGURATION and a DEDICATED_DOWNLINK_PARTIAL_CELL_CONFIGURATION.

COMMON_DOWNLINK_PARTIAL_CELL_CONFIGURATION is used to configure the common parameters of a downlink partial-cell. COMMON_DOWNLINK_PARTIAL_CELL_CONFIGURATION comprises a partial_cell_frequency_region field and a COMMON_PDCCH_CONFIGURATION and a COMMON_PDSCH_CONFIGURATION.

DEDICATED_DOWNLINK_PARTIAL_CELL_CONFIGURATION is used to configure the dedicated (UE specific) parameters of a downlink partial-cell. DEDICATED_DOWNLINK_PARTIAL_CELL_CONFIGURATION comprises a DEDICATE_PDCCH_CONFIGURATION and DEDICATE_PDSCH_CONFIGURATION.

UPLINK_PARTIAL_CELL_BOX is used to configure an additional uplink partial-cell (not for the initial partial-cell). UPLINK_PARTIAL_CELL_BOX comprises a PARTIAL_CELL_IDENTIFIER and a COMMON_UPLINK_PARTIAL_CELL_CONFIGURATION and a DEDICATED_UPLINK_PARTIAL_CELL_CONFIGURATION.

COMMON_UPLINK_PARTIAL_CELL_CONFIGURATION is used to configure common the parameters of an uplink partial-cell. COMMON_UPLINK_PARTIAL_CELL_CONFIGURATION comprises a partial_cell_frequency_region field and a COMMON_PUCCH_CONFIGURATION and a COMMON_PUSCH_CONFIGURATION.

DEDICATED_UPLINK_PARTIAL_CELL_CONFIGURATION is used to configure the dedicated (UE parameters of specific) an uplink partial-cell. DEDICATED_DOWNLINK_PARTIAL_CELL_CONFIGURATION comprises a DEDICATED_PUCCH_CONFIGURATION and DEDICATED_PUSCH_CONFIGURATION.

COMMON_PDCCH_CONFIGURATION is used to configure cell specific PDCCH parameters. COMMON_PDCCH_CONFIGURATION can comprise upto 4 PDCCH_MONITORING_TIME IEs for common-serach-space. The common pdcch-monitoring-time can be used for SIB1 reception or paging reception or random access response reception.

DEDICATE_PDCCH_CONFIGURATION is used to configure UE specific PDCCH parameters. DEDICATE_PDCCH_CONFIGURATION can comprises upto 10 PDCCH_MONITORING_TIME IEs. The PDCCH_MONITORING_TIME IEs in DEDICATE_PDCCH_CONFIGURATION can be either common pdcch-monitoring-time or UE specific pdcch-monitoring-time.

```
PDCCH_MONITORING_TIME defines how/where to search for
PDCCH candidates.
PDCCH_MONITORING_TIME ::= SEQUENCE {
pdcch_monitoring_time_identifier
PDCCH_MONITORING_TIME_IDENTIFIER,
monitoring_slot_periodicity_offset CHOICE {
```

-continued

```
sl1 NULL,
sl2 INTEGER (0..1),
...
} OPTIONAL,
monitoring_duration INTEGER (1..integer) OPTIONAL,
monitoring_symbols_slot BIT STRING (SIZE (14)) OPTIONAL,
number_of_candidates AGGREGATION_LEVEL_CANDIDATE
OPTIONAL,
pdcch_monitoring_type CHOICE {
common_pdcch_monitoring PCS-FORMAT-INFO...
terminal_pdcch_monitoring PCS-FORMAT-INFO
  }
}
```

common_pdcch_monitoring: Configures this pdcch-monitoring-time as common pdcch-monitoring-time and PCS formats to monitor.

monitoring_duration: Number of consecutive slots that a pdcch-monitoring-time lasts in every occasion, i.e., upon every period as given in the monitoring_slot_periodicity_offset.

monitoring_slot_periodicity_offset: Slots for PDCCH monitoring configured as periodicity and offset.

number_of_candidates: Number of PDCCH candidates per aggregation level.

pdcch_monitoring_type: Indicates whether this is a common pdcch-monitoring-time or a UE specific pdcch-monitoring-time and PCS formats to monitor for.

terminal_pdcch_monitoring: Configures this pdcch-monitoring-time as UE specific pdcch-monitoring-time.

PCS-FORMAT-INFO indicates the format of the set of downlink control information associate with the PDCCH_MONITORING_TIME A subset of the total cell bandwidth of a cell is referred to as a partial-cell. Frequency domain location and bandwidth of a partial-cell is indicated by a partial_cell_frequency_region field. The partial_cell_frequency_region field includes an integer. The integer indicates a starting resource block and a length in terms of contiguously allocated resource blocks.

A partial-cell is either a first type partial-cell or a second type partial-cell.

The first type partial-cell is used by either idle state UE or by connected state UE. The partial_cell_frequency_region field for the first type partial-cell is indicated in a first type serving cell configuration (CELL_SPECIFIC_CELL_CONFIGURATION). The second type partial-cell is used by connected sate UE. The partial_cell_frequency_region field for the second type partial-cell is indicated in a second type serving cell configuration (TERMINAL_SPECIFIC_CELL_ CONFIGURATION).

A Physical Layer Control Information Set (PCS) transports a set of downlink control information for one or more cells with one local-terminal-identifier.

local-terminal-identifier is 16 bit locally unique (within a cell) temporary identifier allocated to a UE (or group of UEs).

local-terminal-identifier is either local-scheduling-identifier or local-non-scheduling-identifier.

local-scheduling-identifier used in the current serving cell is:

- >1: allocated by local_scheduling_identifier received in the previous serving cell (before handed over to the current cell),
- >1: used for scrambling CRC attached to typ1 PCS
- >>2: type 1 PCS transports uplink scheduling or downlink scheduling,
- >>2: type 1 PCS has associated shared channel (e.g. PDSCH or PUSCH)
- >1: used for identifying the UE in a specific uplink MAC CE (i.e. CR MAC CE used in the contention resolution)

local-non-scheduling-identifier-layer3 used in the current serving cell is:

- >1: allocated by local_non_scheduling_identifier_layer3 received in the current serving cell,
- >1: used for scrambling CRC attached to a first type 2 PCS,
- >>2: the first type2 PCS transports one or more information blocks,
- >>2: the first type2 PCS has no associated shared channel
- >1: used for triggering layer 3 related behaviours (or behaviour performed by layer 3) like conditional reconfiguration evaluation.

local-non-scheduling-identifier-layer1 used in the current serving cell is:

- >1: allocated by local_non_scheduling_identifier_layer1 received in the current serving cell,
- >1: used for scrambling CRC attached to a second type 2 PCS,
- >>2: the second type2 PCS transports transmission power control blocks,
- >>2: the second type2 PCS has no associated shared channel
- >1: used for triggering layer 1 related behaviours (or behaviour performed by layer 1) like uplink transmission power update.

The set of control information included in a PCS is defined per PCS format.

PCS in format-a (PCS-a) includes PUSCH scheduling information. It is addressed by a LOCAL_scheduling_identifier.

PCS in format-b includes PDSCH scheduling information. It is addressed by a LOCAL_scheduling_identifier.

PCS in format-c includes one or more indication blocks. It is addressed by a LOCAL_non_scheduling_identifier_layer3.

PCS in format-d includes one or more transmission power control blocks. It is addressed by a LOCAL_non_scheduling_identifier_layer1.

UE monitors LOCAL_scheduling_identifier during a first specific pdcch-monitoring-time.

UE monitors LOCAL_non_scheduling_identifier_layer3 during a second specific pdcch-monitoring-time.

UE monitors LOCAL_non_scheduling_identifier_layer1 during a third specific pdcch-monitoring-time.

PDCCH_MONITORING_TIME configuring the first specific pdcch-monitoring-time has following fields:

- >1: pdcch_monitoring_type is set to terminal_pdcch_monitoring
- >1: PCS-FORMAT-INFO in terminal_pdech_monitoring indicates format-a and format-b PDCCH_MONITORING_TIME configuring the second specific pdcch-monitoring-time has following fields:

- >1: pdcch_monitoring_type is set to common_pdcch_monitoring
- >1: PCS-FORMAT-INFO in terminal_pdcch_monitoring indicates format-c PDCCH_MONITORING_TIME configuring the third specific pdcch-monitoring-time has following fields:

- >1: pdcch_monitoring_type is set to common_pdcch_monitoring
- >1: PCS-FORMAT-INFO in terminal_pdcch_monitoring indicates format-d CONDITIONAL_RECONFIGURATION is configuration of candidate target SpCell(s) and execution condition(s) for conditional handover, conditional PSCell addition or conditional PSCell change.

```
CONDITIONAL_RECONFIGURATION comprises following fields
and IEs
CONDITIONAL_RECONFIGURATION ::= SEQUENCE {
attemp_candidate_rrc_reconfiguration ENUMERATED {true}
OPTIONAL,
candidate_rrc_reconfiguration_box_list
CANDIDATE_RRC_RECONFIGURATION_BOX_LIST OPTIONAL,
}
```

CONDITIONAL_RECONFIGURATION Field Descriptions attemp_candidate_rrc_reconfiguration: If present, the UE shall perform conditional reconfiguration if selected cell is a target candidate cell and it is the first cell selection after failure.

candidate_rrc_reconfiguration_box_list: List of the configuration of candidate SpCells to be added or modified for CHO, CPA or CPC. candidate_rrc_reconfiguration_box_list comprises a one or more CANDIDATE_RRC_RECONFIGURATION_BOX.

CANDIDATE_RRC_RECONFIGURATION_BOX contains configuration of candidate SpCells and associated identifier and information on one or more second type events.

```
CANDIDATE_RRC_RECONFIGURATION_BOX ::= SEQUENCE
{
candidate_rrc_reconfiguration_identifier
CANDIDATE_RRC_RECONFIGURATION_IDENTIFIER,
candidate_rrc_reconfiguration_execution_condition SEQUENCE
(SIZE (1..2)) OF MEASUREMENT_IDENTIFIER OPTIONAL,
candidate_rrc_reconfiguration OCTET STRING (CONTAINING RRC
Reconfiguration Message) OPTIONAL,
cell_measurement_based_selection ENUMERATED {true}
OPTIONAL,
selection_priority INTEGER (0,..,7) OPTIONAL,
disable_s_measure ENUMERATED {true} OPTIONAL,
associated_rrc_reconfiguration
CANDIDATE_RRC_RECONFIGURATION_IDENTIFIER
OPTIONAL,
indication_block_index INTEGER (0,..,7) OPTIONAL,
immediate_reconfiguration ENUMERATED {true} OPTIONAL,
}
```

CANDIDATE_RRC_RECONFIGURATION_BOX Field Descriptions candidate_rrc_reconfiguration_execution_condition: The execution condition that needs to be fulfilled in order to trigger the execution of a conditional reconfiguration for CHO. This field can include one or two MEASUREMENT_IDENTIFIER of type 2 measurement-identifier.

candidate_rrc_reconfiguration: The RRC Reconfiguration Message to be applied when the condition(s) are fulfilled.

associated_rrc_reconfiguration: indicates associated CANDIDATE_RRC_RECONFIGURATION_BOX. UE applied the candidate_rrc_reconfiguration in the associated CANDIDATE_RRC_RECONFIGURATION_BOX when candidate_rrc_reconfiguration_execution_condition of this CANDIDATE_RRC_RECONFIGURATION_BOX is fulfilled. If this field is present, candidate_rrc_reconfiguration is absent. If this field is absent, candidate_rrc_reconfiguration is present.

indication_block_index: indicates the indication block corresponding to the CANDIDATE_RRC_RECONFIGURATION_BOX (or CANDIDATE_rrc_reconfiguration_identifier). Value n means (n+1)th indication block. If this field is absent, PCS format-c is not applicable to this CANDIDATE_RRC_RECONFIGURATION_BOX.

immediate_reconfiguration: indicates whether this CANDIDATE_RRC_RECONFIGURATION_BOX (or second applicable cell or candidate target cell of this CANDIDATE_RRC_RECONFIGURATION_BOX) is subject to immediate-reconfiguration-upon-reference-signal-stop.

Figure 2:
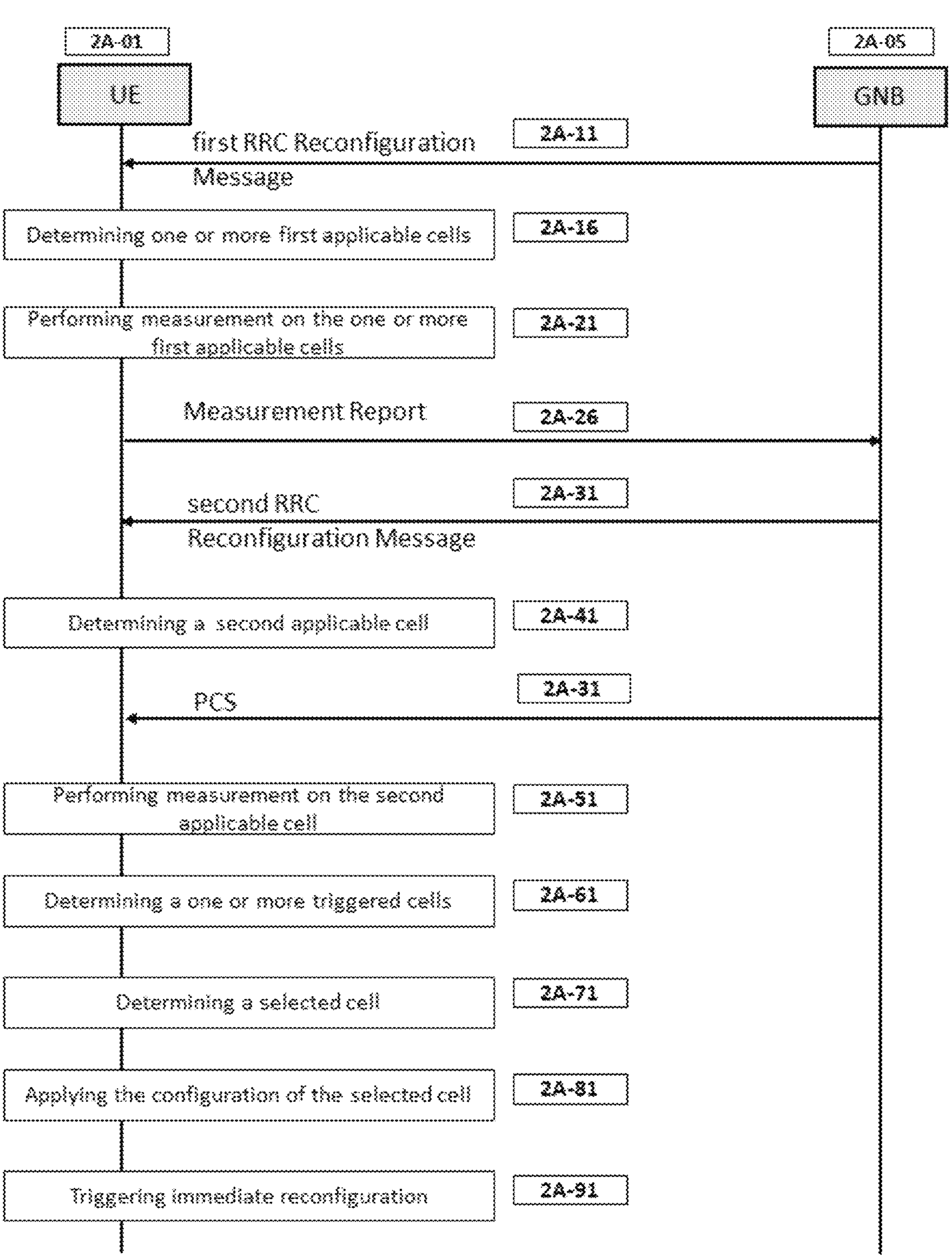
FIG. 2 is a diagram illustrating operations of a terminal and a base station according to an embodiment of the present invention.

FIG. 2 illustrates the operations of the UE and the base station.

At 2A-11, UE receives a first RRC Reconfiguration Message from a base station. The first RRC Reconfiguration Message may include measurement configuration information (MEASUREMENT_CONFIGURATION). The MEASUREMENT_CONFIGURATION comprises one or more MEASUREMENT_IDENTIFIERs. The MEASUREMENT_identifiers in the MEASUREMENT_CONFIGURATION are either a first type measurement-identifieror a second type measurement-identifier.

UE stores the received MEASUREMENT_CONFIGURATION in VARIABLE_MEASUREMENT_CONFIGURATION.

At 2A-16, UE determines one or more first applicable cells for each first type measurement-identifier.

UE shall:

>1: if the type1_event_a3 or type1_event_a5 is configured in the corresponding REPORT_CONFIGURATION:

>>2: if a serving cell is associated with a MEASUREMENT_OBJECT_NR and neighbours are associated with another MEASUREMENT_OBJECT_NR, consider any serving cell associated with the other MEASUREMENT_OBJECT_NR to be a neighbouring cell as well. The neighbouring cells are first applicable cells for this first type measurement-identifier.

>1: the type1_event_a4 if is configured in the corresponding REPORT_CONFIGURATION:

>>2: consider any neighbouring cell detected based on parameters in the associated MEASUREMENT_OBJECT_NR to be applicable for this first type measurement-identifier.

At 2A-21, UE performs measurement on the special cell and the one or more first applicable cells.

UE performs measurement on the one or more first applicable cells based on the first set of measurement rules. UE performs measurement on the special cell based on a second set of measurement rules.

In the first set of measurement rules, UE shall:

>1: applies a first measurement cycle.

>>2: The first measurement cycle is determined based on the DRX cycle or based on a measurement_cycle_scell in the associated MEASUREMENT_OBJECT_NR.

>>>3: If the MEASUREMENT_OBJECT_NR is associated with a serving cell (special cell or SCell) and the serving cell is activated, or if the MEASUREMENT_OBJECT_NR is not associated with any serving cell, >>>>4: the first measurement cycle is equal to the DRX cycle.

>>>3: If the MEASUREMENT_OBJECT_NR is associated with a SCell and the SCell is deactivated, >>>>4: the first measurement cycle is equal to the measurement_cycle_scell.

>1: perform measurement if RSRP of the special cell is lower than a RSRP threshold.

>1: skip measurement if RSRP of the special cell is higher than the RSRP threshold.

In the second set of measurement rules, UE shall:

>1: applies a second measurement cycle.

>>2: The second measurement cycle is determined based on the DRX cycle or a fixed time value.

>>>3: If DRX is configured, the second measurement cycle is equal to the DRX cycle.

>>>3: If DRX is not configured, the second measurement cycle is equal to the fixed time interval.

>1: perform measurement regardless of RSRP of the special cell being lower than or higher than the RSRP threshold.

A measurement cycle is a periodicity for UE to determine measured result. Every once in a measurement cycle, UE determines a filtered measured result based on a plurality of measurement sample taken at the physical layer.

UE performs measurement on the one or more first applicable cells based on the first filter. UE filters the measured results on the special cell based on the second filter.

The filter coefficient of the first filter is indicated by measurement_quantity_configuration_index in MEASUREMENT_OBJECT_NR associated with the first applicable cell.

The filter coefficient of the second filter is indicated by measurement_quantity_configuration_index in MEASUREMENT_OBJECT_NR associated with the special cell.

UE filters the measured result, before using for evaluation of reporting criteria or for measurement reporting, by the following formula:

$$\mathrm{F\_n} = (1-a) * \mathrm{F\_n} - 1 + a * \mathrm{M\_n}$$

M_n is the latest received measurement result from the physical layer;

F_n is the updated filtered measurement result, that is used for evaluation of reporting criteria or for measurement reporting;

F_n−1 is the old filtered measurement result, where F_0 is set to M_1 when the first measurement result from the physical layer is received; and for MEASUREMENT_OBJECT_NR, a=1/2^(k_i/4), where k_i is the FILTER_COEFFICIENT for the corresponding measurement quantity of the i:th MEASUREMENT_QAUNTITY_CONFIGURATION_NR in indicated by measurement_qauntity_configuration_nr_list, and i is measurement_quantity_configuration_index in MEASUREMENT_OBJECT_NR;

If REPORT_CONFIGURATION associated with a MEASUREMENT_identifier comprises TYPE1_EVENT_CONFIGURATION, UE may skip measurement on non-serving cells for the MEASUREMENT_identifier based on SKIP_MEASUREMENT_CONFIGURATION and SpCell RSRP.

UE shall:

>1: if SKIP_MEASUREMENT_CONFIGURATION is set to ssb_rsrp and the NR SpCell RSRP based on SS/PBCH block, after layer 3 filtering, is higher than ssb_rsrp, or >1: if SKIP_MEASUREMENT_CONFIGURATION is set to csi_rsrp and the NR SpCell RSRP based on CSI-RS, after layer 3 filtering, is higher than csi_rsrp:

>>2: does not perform measurement on RSRP or CSI-RS for one or more first applicable cells of the MEASUREMENT_identifier.

>1: if SKIP_MEASUREMENT_CONFIGURATION is set to ssb_rsrp and the NR SpCell RSRP based on SS/PBCH block, after layer 3 filtering, is lower than ssb_rsrp, or >1: if SKIP_MEASUREMENT_CONFIGURATION is set to csi_rsrp and the NR SpCell RSRP based on CSI-RS, after layer 3 filtering, is lower than csi_rsrp:

>>2: if the measurement-object is associated to NR and the reference_signal_type is set to csi-rs:

>>>3: derive cell measurement results, for one or more first applicable cells, based on CSI-RS for the trigger quantity using parameters from the associated MEASUREMENT_OBJECT_NR;

>>2: if the measurement-object is associated to NR and the reference_signal_type is set to ssb:

>>>3: derive cell measurement results, for one or more first applicable cells, based on SS/PBCH block for the trigger quantity using parameters from the associated MEASUREMENT_OBJECT_NR.

At 2A-26, for each first type measurement-identifier which the measurement reporting procedure was triggered, UE includes the measurement results of the special cell and the measurement results of the one or more first applicable cells in the Measurement Report Message and transmits the Measurement Report Message.

At 2A-31, UE receives a second RRC Reconfiguration Message from the base station. The second RRC Reconfiguration Message may include conditional reconfiguration information (CONDITIONAL_RECONFIGURATION). The second RRC Reconfiguration Message may include PDCCH configuration information.

A CONDITIONAL_RECONFIGURATION comprises one or more CANDIDATE_RRC_RECONFIGURATION_BOXs.

Each of the one or more CANDIDATE_RRC_RECONFIGURATION_BOXs comprises one or two MEASUREMENT_IDENTIFIERs and a candidate_rrc_reconfiguration.

UE stores the received one or more CANDIDATE_RRC_RECONFIGURATION_BOXs in a VARIABLE_CONDITIONAL_RECONFIGURATION.

At 2A-41, UE determines a second applicable cell for each CANDIDATE_RRC_RECONFIGURATION_IDENTIFIER within the VARIABLE_CONDITIONAL_RECONFIGURATION.

UE shall:

>1: for each CANDIDATE_rrc_reconfiguration_identifier within the VARIABLE_CONDITIONAL_RECONFIGURATION:

>>2: if the CANDIDATE_RRC_RECONFIGURATION_BOX includes an associated_rrc_reconfiguration, >>>3: if the RRC Reconfiguration Message within a first candidate_rrc_reconfiguration includes the master_ cell_group including the TARGET_CELL_CONFIGURATION:

>>>>4: consider the cell which has a local-cell-identifier matching the value indicated in the CELL_SPECIFIC_CELL_CONFIGURATION included in the TARGET_CELL_CONFIGURATION within the master_cell_group in the first candidate_rrc_reconfiguration to be applicable cell (or consider the cell which has a physical cell identity matching the value of target candidate cell within the first candidate_rrc_reconfiguration to be applicable cell).

>>2: if the CANDIDATE_RRC_RECONFIGURATION_BOX does not include an associated_rrc_reconfiguration, >>>3: if the RRC Reconfiguration Message within a second candidate_rrc_reconfiguration includes the master_cell_group including the target_cell_configuration: or >>>>4: consider the cell which has a local-cell-identifier matching the value indicated in the CELL_SPECIFIC_CELL_CONFIGURATION included in the TARGET_CELL_CONFIGURATION within the master_cell_group in the second candidate_rrc_reconfiguration to be applicable cell (or consider the cell which has a physical cell identity matching the value of target candidate cell within the first candidate_rrc_reconfiguration to be applicable cell).

The first candidate_rrc_reconfiguration is the candidate_rrc_reconfiguration included in a CANDIDATE_RRC_RECONFIGURATION_BOX indicated by the associated_rrc_reconfiguration. The CANDIDATE_RRC_RECONFIGURATION_BOX including the candidate_rrc_reconfiguration and the CANDIDATE_RRC_RECONFIGURATION_BOX including associated_rrc_reconfiguration are different CANDIDATE_RRC_RECONFIGURATION_BOXs.

The second candidate_rrc_reconfiguration is the candidate_rrc_reconfiguration included in the CANDIDATE_RRC_RECONFIGURATION_BOX associated with the CANDIDATE_rrc_reconfiguration_identifier.

At 2A-46, UE receives from the base station a PCS.

UE monitors PDCCH in a first pdcch-monitoring-time with a first local-terminal-identifier and in a second pdcch-monitoring-time with a second local-terminal-identifier. The first local-terminal-identifier is indicated in PHYSICAL_CELL_GROUP_CONFIGURATION received in the current cell. The second local-terminal-identifier is indicated in TARGET_CELL_INFORMATION received in the previous cell.

If the PCS in format-c is received in the first pdcch-monitoring-time by the first local-terminal-identifier, UE acts upon the information included in PCS format-c.

PCS format-c includes following information.

>1: one or more indication blocks

>>2: Each indication block corresponds to a CANDIDATE_RRC_RECONFIGURATION_IDENTIFIER >>2: Each indication block consists of two indications.

>>>3: The first indication bit indicates whether measurement on a second applicable cell corresponding to CANDIDATE_rrc_reconfiguration_identifier can be started (and subsequently L3 filtering on the measured result of the second applicable cell).

>>>3: The second indication bit indicates whether conditional reconfiguration evaluation for the corresponding CANDIDATE_rrc_reconfiguration_identifier can be started.

>1: a timing information block

>>2: SFN and subframe number when SSB transmission and CSI-RS transmission and PDCCH transmission and preamble reception and PUCCH reception of this cell (the cell where the PCS is transmitted) will stop.

>1: a first RSRP threshold value for measurement initiation on a second applicable cell >>2: a threshold for measurement initiation on a second applicable cell. If the RSRP of the special cell is lower than this threshold and if the first indication bit of a indication block is set to a first value, UE is required to start measurement on the second applicable cell.

>1: a second RSRP threshold value for conditional reconfiguration evaluation on a second applicable cell >>2: a threshold for execution of conditional reconfiguration. If the RSRP of the special cell is lower than this threshold and if the second indication bit of an indication block is set to a first value, UE is required to start conditional reconfiguration evaluation for a CANDIDATE_rrc_reconfiguration_identifier.

If the PCS in format-a or in format-b is received in the second pdcch-monitoring-time by the second local-terminal-identifier, UE performs uplink transmission or downlink reception based on the downlink information in the PCS.

UE starts measurement on the second applicable cell or evaluate whether conditional reconfiguration can be executed if the PCS format-c is received.

UE performs PUSCH transmission or PDSCH reception if the PCS format-a or PCS format-b is received.

At 2A-51, UE performs measurement on a second applicable cell.

UE performs measurement on the second applicable cell based on the first set of measurement rules during a first measurement time and based on the second set of measurement rules during a second measurement time.

The first measurement time is the period during when NES is not to be applied in a near future. The second measurement time is the period during when NES is to be applied in the near future.

UE determines the first measurement time and the second measurement time based on t1_threshold.

The first measurement time for a second applicable cell is from the point of time when the associated CANDIDATE_RRC_RECONFIGURATION_BOX is received to the point of time indicated by t1_threshold.

The second measurement time for a second applicable cell is from the point of time indicated by t1_threshold to the point of time when RRC reconfiguration occurs or to the point of time indicated by T1_thireshold plus EVALUATION_duration, whichever comes first.

In another embodiment, the first measurement time and the second measurement time are determined based on reception of dci format x.

The first measurement time for a second applicable cell is from the point of time when the associated CANDIDATE_RRC_RECONFIGURATION_BOX is received to the point of time when a specific PCS is received.

The second measurement time for a second applicable cell is from the point of time when the specific PCS is received to the point of time when conditional reconfiguration is executed.

The specific PCS:

>1: is in format-c and

>1: is addressed by the first local-terminal-identifier (LOCAL_non_scheduling_identifier_layer3) and >1: has an indication block corresponding to the CANDIDATE_rrc_reconfiguration_identifier of the second applicable cell and >1: has the first bit of the indication block is set to the first value and >1: has the first threshold value that is lower than the special cell's RSRP. (or the special cell's RSRP is lower than the first threshold)

UE filters the measured result, before using for evaluation of conditional reconfiguration by the following formula:

$$F\_n=(1-a)*F\_n\text{-}1+a*M\_n$$

M_n is the latest received measurement result from the physical layer;

F_n is the updated filtered measurement result, that is used for evaluation of reporting criteria or for measurement reporting;

F_n−1 is the old filtered measurement result, where F_0 is set to M_1 when the first measurement result from the physical layer is received; and for MEASUREMENT_OBJECT_NR, a=1/2^(k_i/4), where k_i is the FILTER_COEFFICIENT for the corresponding measurement quantity of the i: th MEASUREMENT_QAUNTITY_CONFIGURATION_NR in is indicated by measurement_qauntity_configuration_nr_list, and i measurement_quantity_configuration_index_2 in MEASUREMENT_OBJECT_NR; If measurement_quantity_configuration_index_2 is absent, i is indicated by measurement_quantity_configuration_index.

For measurement on SpCell, measurement_quantity_configuration_index in MEASUREMENT_OBJECT_NR for the SpCell is applied.

For measurement on the applicable cell of a MEASUREMENT_IDENTIFIER, measurement_quantity_configuration_index or measurement_quantity_configuration_index_2 in MEASUREMENT_OBJECT_NR associated with the MEASUREMENT_IDENTIFIER is applied.

For a MEASUREMENT_IDENTIFIER, if the skip_measure_disabled field is present (or the skip_measure_disabled is configured) in candidate_rrc_reconfiguration_box, UE performs measurement for the corresponding second applicable cell even when NR SpCell RSRP is higher than ssb_rsrp or csi_rsrp.

In CHO scenario, when the special cell quality is above the threshold configured by the source base station, the UE is not required to perform a first measurements configured by the source base station and required to perform a second measurements configured by the source base station. The first measurement is the measurement configured for measurement reporting. The first measurement is the measurement configured for conditional reconfiguration evaluation and configured without a specific field (skip_measure_disabled). The second measurement is the measurement configured for conditional reconfiguration evaluation and configured with the specific field.

The UE shall, for each MEASUREMENT_IDENTIFIER associated with the second applicable cell:

>1: if the report_type for the associated REPORT_CONFIGURATION is type2_event_triggered, the MEASUREMENT_IDENTIFIER is within the MCG and is MEASUREMENT_CONFIGURATION indicated in the candidate_rrc_reconfiguration_execution_condition associated to a CANDIDATE_RRC_RECONFIGURATION_IDENTIFIER in the MCG VARIABLE_CONDITIONAL_RECONFIGURATION, >>2: if SKIP_MEASUREMENT_CONFIGURATION is not configured, or >>2: if SKIP_MEASUREMENT_CONFIGURATION is configured in MEASUREMENT_CONFIGURATION and skip_measure_disabled is configured in the candidate_rrc_reconfiguration_box, or >>>3: if SKIP_MEASUREMENT_CONFIGURATION is set to ssb_rsrp and the NR SpCell RSRP based on SS/PBCH block, after layer 3 filtering, is lower than ssb_rsrp and skip_measure_disabled is not configured in the candidate_rrc_reconfiguration_box, or >>>3: if SKIP_MEASUREMENT_CONFIGURATION is set to csi_rsrp and the NR SpCell RSRP based on CSI-RS, after layer 3 filtering, is lower than csi_rsrp and skip_measure_disabled is not configured in the candidate_rrc_reconfiguration_box:

>>>>4: if the measurement-object is associated to NR and the reference_signal_type is set to csi-rs:

>>>>>5: derive cell measurement results, for one or more first applicable cells, based on CSI-RS for the trigger quantity using parameters from the associated measurement-object;

>>>>4: if the measurement-object is associated to NR and the reference_signal_type is set to ssb:

>>>>>5: derive cell measurement results, for one or more first applicable cells, based on SS/PBCH block for the trigger quantity using parameters from the associated measurement-object.

For each first type measurement-identifier, UE initiates the measurement reporting procedure if all the first type events associated with the first type measurement-identifier are fulfilled for one or more first applicable cells.

For each second type measurement-identifier, UE initiates conditional reconfiguration if all the second type events associated with the second type measurement-identifier are fulfilled for a single second applicable cell.

At 2A-61, UE determines one or more triggered cells.

If event(s) associated to all MEASUREMENT_identifier(s) within candidate_rrc_reconfiguration_execution_condition for a target candidate cell within the stored candidate_rrc_reconfiguration (or associated candidate_rrc_reconfiguration) are fulfilled, UE considers the target candidate cell within the stored candidate_rrc_reconfiguration (or associated candidate_rrc_reconfiguration), associated to that CANDIDATE_RRC_RECONFIGURATION_IDENTIFIER, as a triggered cell.

The associated candidate_rrc_reconfiguration is the candidate_rrc_reconfiguration included in a candidate_rrc_reconfiguration_box indicated by the associated_rrc_reconfiguration.

The stored candidate_rrc_reconfiguration is the candidate_rrc_reconfiguration included in the candidate_rrc_reconfiguration_box indicated by the candidate_rrc_reconfiguration_identifier.

At 2A-71, UE determine a selected cell for conditional reconfiguration.

If more than one triggered cell exists, UE selects one of the triggered cells as the selected cell for conditional reconfiguration execution.

UE shall:

>1: if a one or more triggered cell exists,

>>2: if cell_measurement_based_selection is configured for the triggered cell (i.e. cell_measurement_based_selection is present in CANDIDATE_RRC_RECONFIGURATION_BOX associated with the triggered cell);

>>>3: selects a triggered cell based on cell quality of the triggered cell. UE selects a triggered cell with the best cell measurement quality;

>>2: if cell_measurement_based_selection is not configured for the configuration information of the triggered cell (i.e. in CANDIDATE_RRC_RECONFIGURATION_BOX associated with the triggered cell);

>>>3: selects a triggered cell based on beam quality of the triggered cell. UE selects a triggered cell with the best beam quality.

In alternative embodiment,

UE shall:

>1: if a one or more triggered cell exists,

>>2: if selection_priority is configured for the triggered cell (i.e., selection_priority is present in CANDIDATE_RRC_RECONFIGURATION_BOX associated with the triggered cell);

>>>3: selects a triggered cell based on the selection_priority of the triggered cell. UE selects a triggered cell with the highest priority (i.e, lowest value in the selection_priority);

>>2: if selection_priority is not configured for the triggered cell (i.e., selection_priority is absent in CANDIDATE_RRC_RECONFIGURATION_BOX associated with the triggered cell);

>>>3: selects a triggered cell based on beam quality of the triggered cell. UE selects a triggered cell with the best beam quality.

GNB includes a cell_measurement_based_selection in all CANDIDATE_RRC_RECONFIGURATION_BOX IEs or none of CANDIDATE_RRC_RECONFIGURATION_BOX IEs in a CONDITIONAL_RECONFIGURATION.

GNB includes a selection_priority in all CANDIDATE_RRC_RECONFIGURATION_BOX IEs or none of CANDIDATE_RRC_RECONFIGURATION_BOX IEs in a CONDITIONAL_RECONFIGURATION.

If a one or more stored candidate_rrc_reconfiguration fulfils the associated type2_event_triggered, UE selects one of the one or more stored (associated) candidate_rrc_reconfiguration for reconfiguration execution.

At 2A-81, UE applies the stored candidate_rrc_reconfiguration of the selected cell.

The candidate_rrc_reconfiguration includes a RRC Reconfiguration Message. The RRC Reconfiguration Message includes a Reconfiguration WithSync.

Upon applying the RRC Reconfiguration Message included in the stored (or associated) candidate_rrc_reconfiguration of the selected cell, UE shall:

>1: starts start timer T304 for the selected cell;

>1: consider the target SpCell to be one on the SSB frequency indicated by the frequency InfoDL with a physical cell identity indicated by the local_cell_identifier (or consider the target SpCell to be the selected cell), >1: start synchronising to the DL of the target SpCell;

>1: acquire the MIB of the target SpCell;

>1: stop timeAlignmentTimer of PTAG and timeAlignmentTimer of STAG;

>1: apply the value of the local_scheduling_identifier as the local-scheduling-identifier for this cell group;

>1: configure lower layers in accordance with the received CELL_SPECIFIC_CELL_CONFIGURATION in the TARGET_CELL_CONFIGURATION;

>1: configure lower layers in accordance with any additional fields, not covered in the previous, if included in the received TARGET_CELL_CONFIGURATION;

At 2A-91, UE triggers immediate reconfiguration if the point of time indicated in the timing information block reaches before selected cell (or triggered cell) is determined (i.e., none of the second applicable cells fulfils the conditions of relevant events).

UE performs followings (immediate-reconfiguration-upon-reference-signal-stop) for immediate reconfiguration. immediate reconfiguration is triggered at the point of time indicated in the timing information block in the latest PCS format-c in the current special cell.

UE shall:

>1: identify second applicable cells for immediate reconfiguration.

>>2: a second applicable cell for immediate reconfiguration is the second applicable cell that immediate_reconfiguration is present (or is configured) in the corresponding CANDIDATE_RRC_RECONFIGURATION_BOX.

>1: selects a second applicable cell with best reference signal quality (e.g. highest RSRP) or with best cell measurement result.

>1: consider the second applicable cell and apply the corresponding RRC Reconfiguration message.

Terminal performs followings.

Terminal receives from a base station a first RRC message, the first RRC message comprises a measurement configuration information.

Terminal determines a one or more first applicable cells.

The one or more first applicable cells correspond to a first measurement-identifier.

A first measurement-identifier is associated with a first type event.

A first type event is an event for triggering a measurement report. The measurement report is triggered when the first type event is fulfilled.

The one or more first applicable cells are detected cells based on parameters in the MEASUREMENT_OBJECT_NR associated with the first measurement-identifier.

Terminal determines a single second applicable cell.

The single second applicable cell corresponds to a one or two second measurement-identifiers.

The one or more second measurement-identifiers are indicated in a candidate_rrc_reconfiguration_box and associated with a candidate_rrc_reconfiguration in the candidate_rrc_reconfiguration_box. A second measurement-identifier is associated with a second type event.

A second type event is an event for triggering a conditional reconfiguration.

The second applicable cell is a cell indicated target_cell_configuration_information in the candidate_rrc_reconfiguration.

Terminal performs measurement on the one or more first applicable cell based on a first set of measurement rules.

The terminal monitors PDCCH of a first cell (SpCell) with a first local-terminal-identifier (local_non_scheduling_identifier_layer3) during a first time period if a first format for a set of downlink control information is configured for the first time period.

The set of downlink control information in the first format comprises one or more blocks and time a information. Each block corresponds to a candidate_rrc_reconfiguration_identifier.

Terminal receives the set of downlink control information in the first format. The terminal starts to generate measurement result for layer 3 filtering for a second applicable cell when the set of control information in the specific format is received.

The terminal monitors PDCCH of a second cell (SCell) with a second local-terminal-identifier (local_non_scheduling_identifier_layer1) during a second time period if a second format for a set of downlink control information is configured for the second time period.

The set of downlink control information in the second format comprises one or more transmission power command.

Terminal performs measurement on the second applicable cell based on that the set of downlink control information in the first format is received. The measurement on the second applicable cell is based on the second set of measurement rules.

The second set of measurement rules comprises 1: performing measurement on the second applicable cell if the RSRP of the special cell is lower than the threshold or if the RSRP of the special cell is higher than the threshold and the disable_s_measure is present in the associated candidate_rrc_reconfiguration_box and 2: not performing measurement if the RSRP of the special cell is higher than the threshold and the disable_s_measure is absent in the associated candidate_rrc_reconfiguration_box.

In another embodiment, the second set of measurement rules comprises performing measurement on the second applicable cell not considering the RSRP of the special cell.

Terminal determines the measurement result of the one or more first applicable cells associated with a MEASUREMENT_OBJECT_NR based on a first filter.

Terminal determines the measurement result of the second applicable cell associated with a MeasOjbectNR based on a second filter.

The first filter is indicated in measurement_quantity_configuration_index of MEASUREMENT_OBJECT_NR.

The second filter is indicated in measurement_quantity_configuration_index_2 of MEASUREMENT_OBJECT_NR.

Terminal determines a cell for the conditional reconfiguration based on the measurement result of the second appliable cell.

Terminal determines a cell to be reported based on the measurement result of the one or more first applicable cells.

Terminal selects a cell for conditional reconfiguration from a one or more triggered cells based on priorities of the one or more triggered cells.

Terminal execute conditional reconfiguration based on the determined measurement result and a stored RRC Reconfiguration message.

The stored RRC Reconfiguration message for a second applicable cell is included in a first container. The measurement identifier associated with the measurement result is included in a second container (candidate_rrc_reconfiguration_box). The first container and the second container have different container identifier. The second container includes an information on the identifier of the first container.

Terminal triggers immediate reconfiguration at the SFN and subframe indicated in the set of downlink control information in the specific format.

FIG. 3A illustrates the operation of the terminal.

At 3A-11, terminal receives from a base station a first RRC message, the first RRC message comprises a measurement configuration information.

At 3A-21, terminal determines a one or more first applicable cells for a first measurement identifier and a single second applicable cell for two second measurement identifiers.

At 3A-31, terminal performs measurement on the one or more first applicable cell based on a first set of measurement rules.

At 3A-41, terminal monitors PDCCH to receive a set of downlink control information.

Terminal monitors PDCCH of a first cell (SpCell) during a first time period if a first format for a set of downlink control information is configured for the first time period.

The terminal monitors PDCCH of a second cell (SCell) during a second time period if a second format for a set of downlink control information is configured for the second time period.

At 3A-51, terminal performs measurement on one or more second applicable cells based on that a set of downlink control information in the first format is received.

At 3A-61, terminal performs conditional reconfiguration to one of the one or more second applicable cells.

Figure 4A:
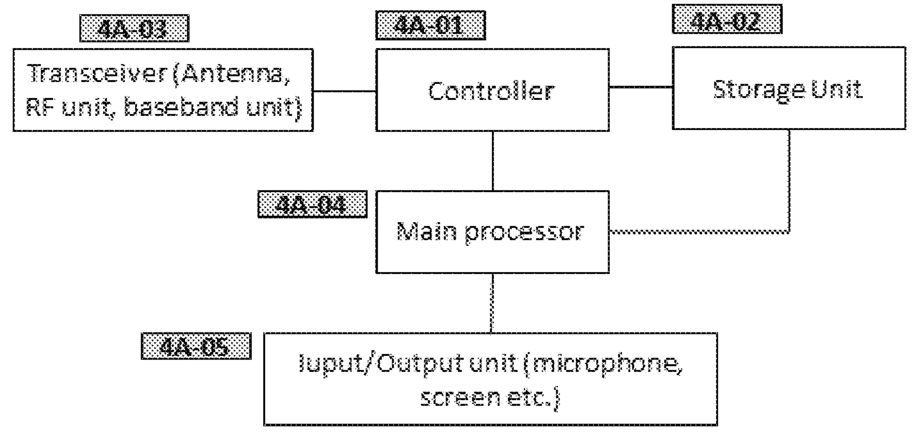
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

Figure 3:
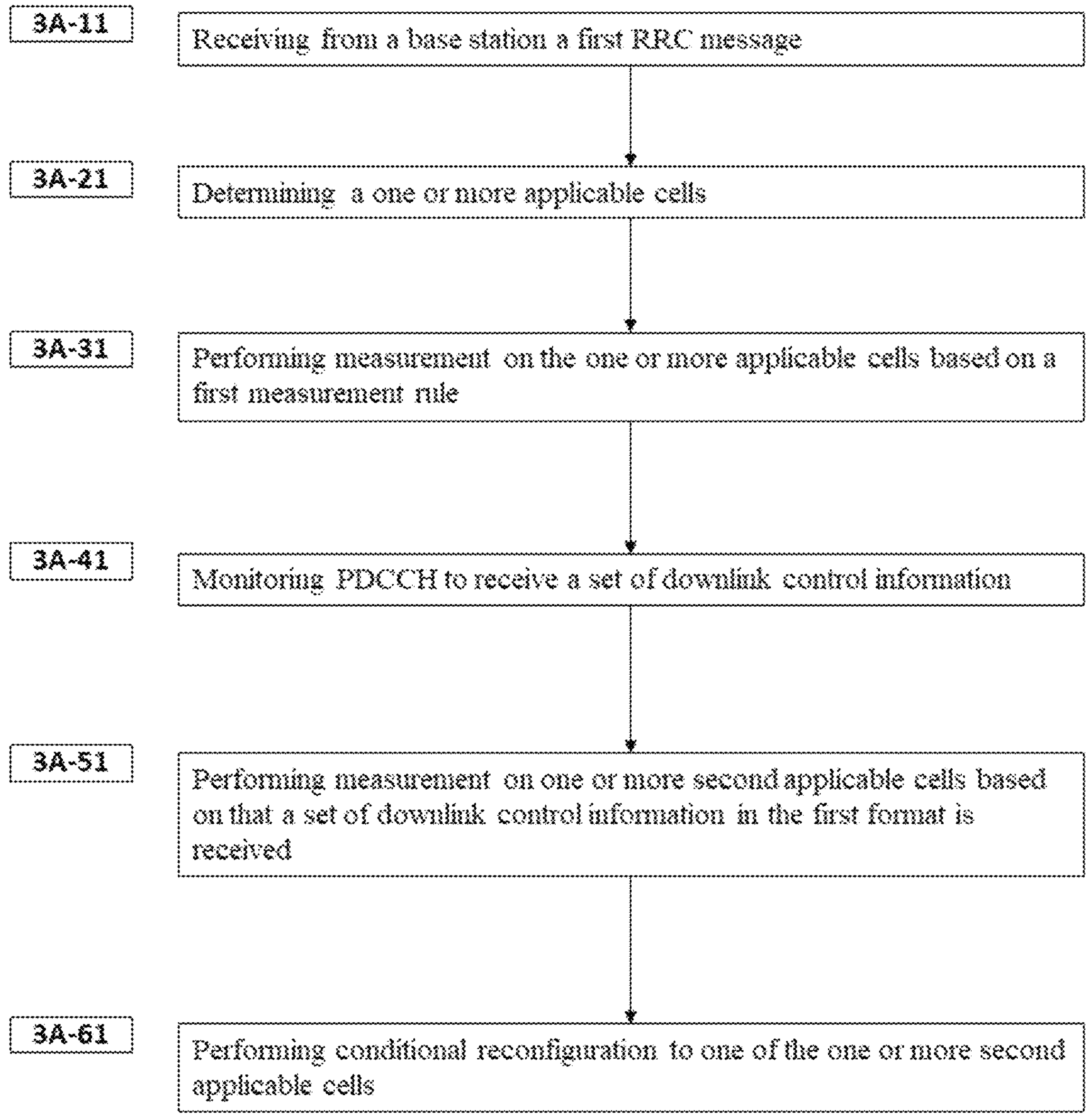
FIG. 3 is a flow diagram illustrating an operation of a terminal.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
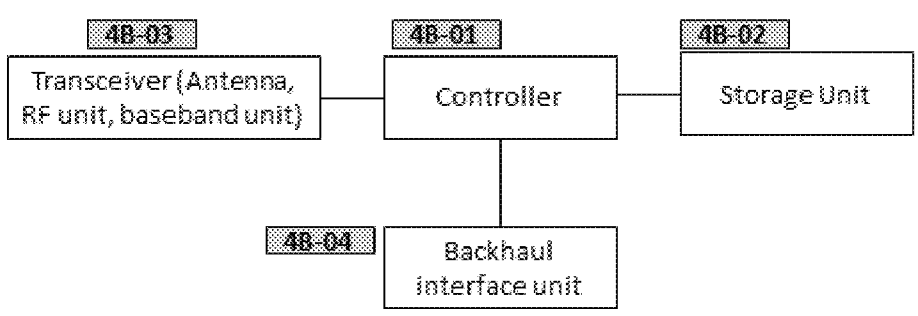
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

Below table lists acronym used in the present invention.

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DTX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |

-continued

| Acronym | Full name | Acronym | Full name |
|---|---|---|---|
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A method by a terminal, the method comprising:

receiving, by the terminal from a base station, a Radio Resource Control (RRC) reconfiguration message, wherein the RRC reconfiguration message comprises one or more sets of conditional reconfiguration parameters, wherein each set of the one or more sets of conditional reconfiguration parameters comprises at least:

a parameter related to one or more events; and an inner RRC reconfiguration message;

receiving, by the terminal from the base station, physical layer control information related to conditional reconfiguration; and applying by the terminal the inner RRC reconfiguration message associated with a specific applicable cell based on:

whether the specific applicable cell is configured with a first parameter;

whether the physical layer control information related to conditional reconfiguration is received;

reference signal received power of the specific applicable cell; and a specific bit of the physical layer control information; and wherein each set of the one or more sets of conditional reconfiguration parameters is associated with an applicable cell.

2. The method of claim 1, wherein the first parameter is related to operation of the terminal in case that the physical layer control information is received.

3. The method of claim 1, wherein the applicable cell is associated with a set of conditional reconfiguration parameters in case that a cell identifier of the applicable cell is comprised in the inner RRC reconfiguration message of the set of conditional reconfiguration parameters.

4. The method of claim 1, wherein the terminal applies the inner RRC reconfiguration message associated with the specific applicable cell in case that:

the specific applicable cell is configured with the first parameter;

the physical layer control information related to conditional reconfiguration is received;

reference signal received power of the specific applicable cell is better than reference signal received power of a second specific cell; and the specific bit of the physical layer control information is set to a first value.

5. The method of claim 1, wherein the terminal applies the inner RRC reconfiguration message associated with the specific applicable cell in case that:

all of one or more events determined from the parameter related to one or more events are fulfilled;

the physical layer control information related to conditional reconfiguration is received; and the specific bit of the physical layer control information is set to a first value.

6. The method of claim 1, wherein the terminal determines a cell is the applicable cell of a set of conditional reconfiguration parameters in case that cell identifier of the cell matches the value indicated in a special cell configuration parameter set of the set of conditional reconfiguration parameters.

7. The method of claim 6, wherein the inner RRC reconfiguration message comprised in the set of conditional reconfiguration parameters comprises the special cell configuration parameter set, wherein the special cell configuration parameter set comprises one or more parameters for target cell configuration.

8. The method of claim 1, the method further comprising, starting, by the terminal, conditional reconfiguration evaluation in case that:

the physical layer control information related to conditional reconfiguration is received; and the specific bit of the physical layer control information is set to a first value.

9. The method of claim 1, wherein the terminal applies the inner RRC reconfiguration message associated with the specific applicable cell in case that one of a first execution condition and a second execution condition is fulfilled.

10. The method of claim 9, wherein the first execution condition and the second execution condition are associated with the inner RRC reconfiguration message.

11. The method of claim 6, wherein the terminal performs measurement for one or more applicable cells determined from the one or more sets of conditional reconfiguration parameters.

12. The method of claim 11, wherein, in case that a second parameter is not present in the set of conditional reconfiguration parameters, the terminal:

performs measurement, during a first time period, for an applicable cell associated with the set of conditional reconfiguration parameters; and does not perform measurement, during a second time period, for the applicable cell associated with the set of conditional reconfiguration parameters.

13. The method of claim 11, wherein, in case that a second parameter is present in the set of conditional reconfiguration parameters, the terminal:

performs measurement, during a first time period, for an applicable cell associated with the set of conditional reconfiguration parameters; and performs measurement, during a second time period, for the applicable cell associated with the set of conditional reconfiguration parameters.

14. The method of claim 13, wherein the first time period is a time period during which reference signal received power of a special cell after filtering is lower than a threshold, and wherein the second time period is a time period during which reference signal received power of the special cell after filtering is higher than the threshold.

15. A terminal in a wireless communication system, the terminal comprising:

a transceiver configured to transmit and receive a signal, and a controller configured to control the transceiver to:

receive from a base station a Radio Resource Control (RRC) reconfiguration message, wherein the RRC reconfiguration message comprises one or more sets of conditional reconfiguration parameters, wherein each set of the one or more sets of conditional reconfiguration parameters comprises at least:

a parameter related to one or more events; and an inner RRC reconfiguration message;

receive from the base station physical layer control information related to conditional reconfiguration; and apply the inner RRC reconfiguration message associated with a specific applicable cell based on:

whether the specific applicable cell is configured with a first parameter;

whether the physical layer control information related to conditional reconfiguration is received;

reference signal received power of the specific applicable cell; and a specific bit of the physical layer control information; and wherein each set of the one or more sets of conditional reconfiguration parameters is associated with an applicable cell.

* * * * *